July 1, 1969 J. ULDERUP 3,453,012
UNIVERSAL JOINT HAVING WEAR RESISTANT SUPPORTING RING FOR
PIVOTALLY SUPPORTING THE HINGE PIN IN THE JOINT HOUSING
Filed Jan. 19, 1967

INVENTOR
JÜRGEN ULDERUP
BY
ATTORNEYS

United States Patent Office 3,453,012
Patented July 1, 1969

3,453,012
UNIVERSAL JOINT HAVING WEAR RESISTANT SUPPORTING RING FOR PIVOTALLY SUPPORTING THE HINGE PIN IN THE JOINT HOUSING
Jürgen Ulderup, 2844 Lemforde, Hann, Germany
Filed Jan. 19, 1967, Ser. No. 610,385
Claims priority, application Germany, Feb. 16, 1966,
U 12,453
Int. Cl. F16c *11/06;* F16b *7/00;* B25g *3/38*
U.S. Cl. 287—87                                                        2 Claims

ABSTRACT OF THE DISCLOSURE

An improved universal joint construction is disclosed in respect to two separate embodiments. In each embodiment, the feature of the construction is that the hinge pin is provided with a substantially cylindrical portion around which is positioned a bearing box or annular bearing member which is pivotally mounted within the hinge pin housing and is rotatably carried by the hinge pin. The invention provides an improved construction wherein the hinge pin and the associated bearing are supported by a special wear resistant supporting ring. With such a construction, there is less likelihood of damage to the housing at the location where the hinge pin extends therethrough. The bearing portion which has an exterior hemispherical bearing surface fits over the cylindrical portion of the hinge pin and rides in the spherical recess defined by the interior by the wall of the housing. There is no likelihood that the bearing box portion of the joint will cause a damage to the opening of the housing at the location into which the hinge pin extends therethrough. The reason for this is that the construction includes a supporting ring of durable wear resistant material which is disposed round the hinge pin, but at the location adjacent the opening to the housing in order to insure that there is no damaging to either the housing or the pivotal support for the hinge pin during operation.

---

In accordance with one embodiment of the invention, the hinge pin is made with a semicylindrical head portion at its top end and is provided with a cylindrical body around which is positioned a bearing box member of elastic material such as plastic or sintered metal. At the lower end of the housing at the location where the pin extends through an opening in the housing, there is provided a ring member which is made of a special wear resistant material such as a steel material and which provides a supporting surface or the bearing which bears against the end or flange portion of the hemispherical end of the pin. In accordance with another embodiment, the bearing box and the supporting ring are held together around the cylindrical portion of the pin by means of a collar bush which has a flange at one end which engages around the bearing box and a flange at the opposite end which engages around the supporting ring to hold them in position around the cylindrical portion of the hinge pin.

Brief summary of the invention

The invention has particular application for a universal joint for the wheel suspension of motor vehicles. Such a joint includes a collar pin which extends axially through a bearing and pivots about a hollow spherical interior surface of a joint housing which forms the supporting surface or the bearing. With such joints where the hinge pin can turn freely, on the one hand, and can be pivoted in the hemispherical bearing on the other hand, in which case the bearing is also moved therewith, there is an advantage in that the necessary pivotal and rotary movements can take place independently of each other. Such joints have the additional advantage of low weight. One drawback is, however, that they do not have sufficient durability. Particularly under high loads, which occur with wheel suspensions of motor vehicles there are material damages which cause premature failure of the various parts.

One reason for the failure of the parts is that the joint housing edges at the location of the hinge pin outlet aperture are not machined accurately. The other surfaces of the bearing are thus worn out during the pivotal and rotary movements. Under high stress of the joint, or excessive wear of the bearing parts, material cants appear in the region of the pin outlet aperture between the joint housing and the bearing box. This results in damages which are observed particularly in bearing boxes which are made of an elastic material such as plastic which is permanently deformed at higher or excessive loads.

All of these shortcomings are also observed in a calotte-shaped bearing which is made of sintered metal. Bearing boxes of sintered metal powder have not only a noise reducing damping property, but due to their porosity, they are also suitable for self-lubrication so that the friction and wear are reduced and they require little maintenance. However, bearings which are made of sintered metal do not have sufficient strength particularly under shock loads. They are brittle and crumble easily under end pressure.

In accordance with the present invention, there is provided an annular bearing box which extends around the cylindrical portion of the hinge pin and is formed of a damping and preferably also self-lubricating material. The hinge pin includes a hemispherical end and the bearing bears against the end portion or collar of the hemispherical end of the pin. A special supporting ring of a wear resistant material is positioned around the cylindrical portion of the hinge pin and provides a bearing surface which bears at its one end against the bearing box and is provided with a hemispherical exterior surface which rides in the hemispherical recess defined within the housing. With such a construction, the bearing is secured against damages which are caused in the range of the pin outlet aperture of the housing and which are due to end pressure. The wear resistant supporting ring which is located in this region is not harmfully influenced by the housing edges because of its durable nature. Even with inaccurate machining of the housing edges which form the pin outlet aperture, the supporting ring which is carried along in the swinging movement of the hinge pin along with the bearing would not be damaged because of its hardness by any uneveness which remains at the edges of the housing rim. Deformation of the elastic bearing is avoided to a great extent by the fact that the bearing box cannot be forced into the pin outlet aperture but will bear only if the relatively wide surface of the supporting ring in the housing which corresponds substantially to the surface formed by the pin collar. In this manner, the damping bearing is stressed more evenly and therefore more favorably under high loads particularly under the shock loads caused by the roadway.

In accordance with a special embodiment of the invention, the bearing and its supporting ring are held around the hinge pin by a special collar bush which includes a flange at each end which engages over the bearing end and the supporting ring outer end to hold these two parts in position over the hinge pin. The collar bush is advantageously made of an elastic plastic and it provides a noise insulation between the hinge pin and the supporting ring. In addition, this aids in the assembly of the joint because the flange of the sliding bush will engage the supporting ring and the bearing to hold these two parts together as a preassembled subunit of the joint and they can be easily inserted together with the collar pin into the joint housing. In this manner, the assembly of the joint in the housing is simplified.

Accordingly, it is an object of the invention to provide an improved universal joint construction which includes a hinge pin having a collar adjacent one end with an annular bearing positioned around the hinge pin adjacent the collar and with a supporting ring positioned around the hinge pin adjacent the bearing box at a location to engage the housing of the hinge pin at the location of the housing where the pin passes through an opening thereof, the supporting ring being made of a wear resistant material which will be less subject to wear as a result of any unevenness of the housing at the location surrounding the opening.

A further object of the invention is to provide a universal joint which is simple in design, relatively small in height and which insures a good noise reduction and sufficient self-lubrication of the parts during operation and which is resistant enough to high loads to insure long life with satisfactory operation.

A further object of the invention is to provide a hinge pin which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

*Detailed description*

Figures 1A, 1B:
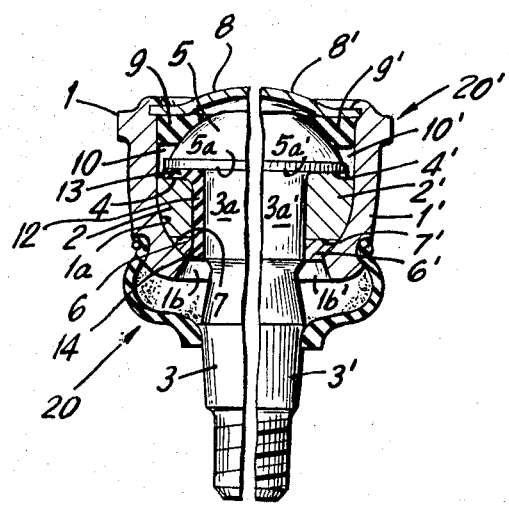
FIG. 1a is a partial transverse sectional view of a universal joint constructed in accordance with the invention.
FIG. 1b is a complementary partial sectional view of another embodiment of the hinge pin.

Referring to the drawings, in particular, the invention embodied therein in FIG. 1a comprises a universal joint generally designated 20 which includes a housing 1 having a hemispherical interior bearing surface 1a. A hinge pin 3 is arranged to extend through an opening 1b at one end through which the pin portion of the hinge pin 3 extends.

In accordance with the invention, the hinge pin 3 is provided with a hemispherical end 5 terminating in a collar portion 5a. The hinge pin includes a cylindrical surface 3a around which is positioned a bearing or annular member 2 and, in accordance with a feature of the invention, a supporting ring 6. The bearing 2 has the form of a calotte whose upper surface 4 bears against a flange 13 of a collar bush 12. The bearing box 2 is made of a material with damping properties such as an elastic plastic material, a sintered metal material, etc. The supporting ring 6 is made of a wear resistant material with a high loading capacity such as a steel material and it forms a supporting surface 7 for the bearing 2.

The aperture 1b of the housing is closed in a known manner by an elastic sleeve 11 which is secured by a clamping ring on the housing 1 and on the hinge pin 3. At the opposite end, the housing 1 is closed by a bordered locking plate 8 after an elastic ring 9 is arranged in a known manner between the plate and the hemispherical surface 5 of the hinge pin 3. The annular space 10 between the elastic ring 9 and the bearing 2 may be filled with a lubricating material such as grease.

In the embodiment of FIG. 1b, there is provided a universal joint 20' which includes similar parts similarly designated but with primes added. In this embodiment, no collar bush is employed and the bearing 2' is provided with an upper surface 4' which bears directly against the collar 5a'. The supporting ring 6' is made with a bore sufficient to fit over the cylindrical portion 3a' of the hinge pin 3' and it has an upper surface 7' which provides a support for the bearing 2'.

One advantage of the embodiment of FIG. 1a is that the ring 6 and the bearing 2 may be assembled over the pin and around the bush 12 before the pin is positioned in the housing and the collar or flange portion 14 of the bush 12 can be locked by a temporary elastic deformation around the supporting ring 6 so that the supporting ring and the bearing 2 are held together to facilitate the assembly. In the event that no sliding bush 12 is employed, the supporting ring 6' can be mounted either in a fixed mounting or slidably on the cylindrical portion 3a' of the hinge pin 3'.

I claim:

1. A universal joint comprising a housing having a hinge pin opening at one end and having an interior semispherical surface adjacent the hinge pin opening, a hinge pin having a pin portion extending through the pin opening of said housing, an annular bearing member rotatable on said hinge pin and having a partial spherical outer surface slidable on the semispherical surface on the interior of said housing, a ring of wear resistant material of high loading capacity adjacent one end of said bearing member and having an exterior partially spherically surface resting on the spherical surface on the inside of said joint housing, and a collar bushing of elastic material having good sliding characteristics separating said bearing member and said ring from said pin and including a flange portion at each end engageable around said ring and said annular bearing member respectively.

2. A universal joint comprising a housing having a hinge-pin opening at one end and having an interior semispherical surface adjacent the hinge-pin opening, a hinge pin having a pin portion extending through the hinge pin opening of said housing and a cylindrical portion within said housing terminating in a hemispherical portion adjacent the end of said pin, a resilient ring member engaged over the hemispherical portion of said hinge pin and bearing against said housing, a cover member holding said resilient ring member in position in said housing over said pin, an annular bearing member arranged on the cylindrical portion of said hinge pin and having a partial spherical outer surface slidable on the hemispherical surface on the interior of said housing, a ring of wear resistant material of high loading capacity and jacent one end of said annular bearing member and having an exterior partially spherical surface resting on the hemispherical surface on the inside of said joint housing, a collar bush disposed around the cylindrical portion of said pin between said pin and each of said annular bearing member and said ring of wear resistant material, said collar bush having a flange at each end engaged around a respective end of said bearing member and said ring of wear resistant material respectively.

References Cited

UNITED STATES PATENTS

| 2,924,469 | 2/1960 | Moskovitz. | |
| 2,936,188 | 5/1960 | Moskovitz. | |
| 2,937,895 | 5/1960 | Langen et al. | 287—87 |
| 3,099,469 | 7/1963 | Gottschald. | |
| 3,208,779 | 9/1965 | Sullivan | 287—87 |
| 3,363,921 | 1/1968 | Gottschald. | |

CARL W. TOMLIN, *Primary Examiner.*

A. V. KUNDRAT, *Assistant Examiner.*